(12) United States Patent
Sugden

(10) Patent No.: US 6,511,019 B2
(45) Date of Patent: Jan. 28, 2003

(54) SHORT-HAUL ESCAPE SYSTEM AND METHOD

(76) Inventor: Richard Sugden, P.O. Box 2468, Jackson, WY (US) 83001

( * ) Notice: Subject to any disclaimer, the term of this patent is extended or adjusted under 35 U.S.C. 154(b) by 0 days.

(21) Appl. No.: 10/010,180

(22) Filed: Nov. 5, 2001

(65) Prior Publication Data

US 2002/0053626 A1 May 9, 2002

Related U.S. Application Data

(60) Provisional application No. 60/247,605, filed on Nov. 8, 2000.

(51) Int. Cl.[7] ............................................. B64C 17/00
(52) U.S. Cl. ............................... 244/138 R; 244/147
(58) Field of Search ....................... 244/138 R, 149, 244/148, 137.3, 147, 137.4, 151 B, 141

(56) References Cited

U.S. PATENT DOCUMENTS

| | | | | |
|---|---|---|---|---|
| 2,707,600 A | | 5/1955 | Johnson ........................ 244/2 |
| 3,156,442 A | | 11/1964 | Pourchet ..................... 244/138 |
| 3,343,189 A | | 9/1967 | Pollard et al. ................. 9/312 |
| 3,740,007 A | | 6/1973 | Waller .................... 244/137 P |
| 4,187,570 A | | 2/1980 | DeSimone ....................... 9/14 |
| 4,379,534 A | * | 4/1983 | Miller et al. ................ 102/354 |
| 4,639,229 A | | 1/1987 | Wright et al. ................. 441/42 |
| 4,679,260 A | | 7/1987 | Frettem ....................... 5/82 R |
| 5,283,916 A | | 2/1994 | Haro .......................... 5/81.1 |
| 5,813,536 A | | 9/1998 | Bartholomew .............. 206/449 |
| 5,816,535 A | * | 10/1998 | Underwood et al. ...... 244/137.3 |
| 5,829,078 A | | 11/1998 | Rivers ........................... 5/629 |

* cited by examiner

Primary Examiner—Peter M. Poon
Assistant Examiner—Timothy D. Collins
(74) Attorney, Agent, or Firm—Flanagan & Flanagan; John R. Flanagan

(57) ABSTRACT

A short-haul escape system includes an elongated line for detachable suspension from a support member on an airborne vehicle, a load-carrying receptacle attached to an end of the line, a container attachable to the airborne vehicle in proximity to the support member thereon and releasably stowing a parachute such that the parachute can be pulled from the container, and a flexible strap attached to the parachute stowed in the container and extending from the container and secured to the short-haul line such that upon detaching the line from the support member of the airborne vehicle, which will cause the line and receptacle to fall away from the airborne vehicle, the flexible strap will pull the parachute from the container so that the parachute can inflate and slow the fall of the line and receptacle to a soft landing.

20 Claims, 3 Drawing Sheets

SHORT-HAUL ESCAPE SYSTEM AND METHOD

This patent application claims the benefit of U.S. provisional application No. 60/247,605, filed Nov. 8, 2000.

BACKGROUND OF THE INVENTION

1. Field of the Invention

The present invention generally relates to air rescue of injured individuals and, more particularly, is concerned with a short-haul escape system and method.

2. Description of the Prior Art

Across the country, especially in the National Park system, injured individuals in precarious terrain are routinely extracted using a helicopter and a "short haul" technique. This technique involves suspending the injured individual in a litter (stretcher), and possibly a rescuer, under the helicopter on a 100 to 150 foot length of rope and then flying them to level terrain where they can be lowered to the ground and transferred to medical care.

This technique has worked well, but is very risky for both the rescuer and injured individual, in that single engine helicopters are usually used and, if the engine fails, the persons suspended beneath the helicopter and possibly persons in the vicinity on the ground may be seriously injured or killed from any resultant helicopter crash.

Devices of various constructions for air and water rescue of individuals have been proposed in the prior art. Some representative examples of these prior art devices are found in U.S. Pat. No. 2,707,600 to Johnson, U.S. Pat. No. 3,156,442 to Pourchet, U.S. Pat. No. 3,343,189 to Pollard et al., U.S. Pat. No. 3,740,007 to Waller, U.S. Pat. No. 4,187,570 to DeSimone, U.S. Pat. No. 4,639,229 to Wright et al., U.S. Pat. No. 4,679,260 to Fretten, U.S. Pat. No. 5,283,916 to Haro and U.S. Pat. No. 5,829,078 to Rivers. While these prior art devices may be satisfactory in use for the specific purposes for which they were designed, none of them seem to provide an effective solution for the above-described problem at hand.

Consequently, a need still exists for an innovation which will provide a solution to the aforementioned problem in the prior art without introducing any new problems in place thereof.

SUMMARY OF THE INVENTION

The present invention provides a short-haul escape system and method designed to satisfy the aforementioned need. The system and method of the present invention, by utilizing an automatically deployable parachute, allows the suspended individuals to survive a helicopter engine failure, or an inadvertent release from the helicopter.

Accordingly, the present invention is directed to a short-haul escape system which comprises: (a) an elongated load line for detachable suspension from a support member on a load-transporting airborne vehicle; (b) a load-carrying receptacle attached to an end of the load line; (c) a parachute; (d) a container attachable to the airborne vehicle in proximity to the support member thereon and releasably stowing the parachute such that the parachute can be pulled from the container; and (e) an interconnecting member attached at one end to the parachute stowed in the container and extending from the container to an opposite end of the interconnecting member secured to the load line such that upon detaching the load line from the support member of the airborne vehicle, which will cause the load line and load-carrying receptacle to fall away from the airborne vehicle, the interconnecting member will pull the parachute from the container so that the parachute can inflate and slow the fall of the load line and receptacle to a soft landing.

More particularly, the container has a releasable means for permitting pullout release of the parachute from the container. The releasable means of the container may be a rupturable portion of the container. Also, in one embodiment, the load line has a loop formed at an opposite end of the load line being removably receivable on the support member in the form of a cargo support hook on the airborne vehicle. The opposite end of the interconnecting member is coupled to the loop at the opposite end the load line by a link element. Also, in a modified embodiment, the opposite end of the interconnecting member is coupled to the load line and a force generating mechanism is provided which is actuatable to release the load line from the support member in the form of a hoist on the airborne vehicle. The interconnecting member is a flexible strap.

The present invention also is directed to a short-haul escape method which comprises the steps of: (a) providing a container having a parachute stowed therein and releasable means for permitting pullout release of the parachute from the container; (b) attaching the container to a load-transporting airborne vehicle in proximity to a support member on the vehicle; (c) detachably attaching an elongated load line to the support member on the airborne vehicle and an end of the load line to a load-carrying receptacle; (d) connecting one end of an interconnecting member to the parachute stowed in the container and extending the interconnecting member from the container through the releasable means of the container; (e) connecting an opposite end of the interconnecting member to the load line adjacent to the support member on the airborne vehicle; (f) detaching the load line from the support member so as to cause the load line and load-carrying receptacle to fall away from the airborne vehicle; and (g) in response to detaching the load line from the support member on the airborne vehicle, pulling the parachute from the container by the interconnecting member so that the parachute can inflate and slow the fall of the load line and receptacle to a soft landing.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
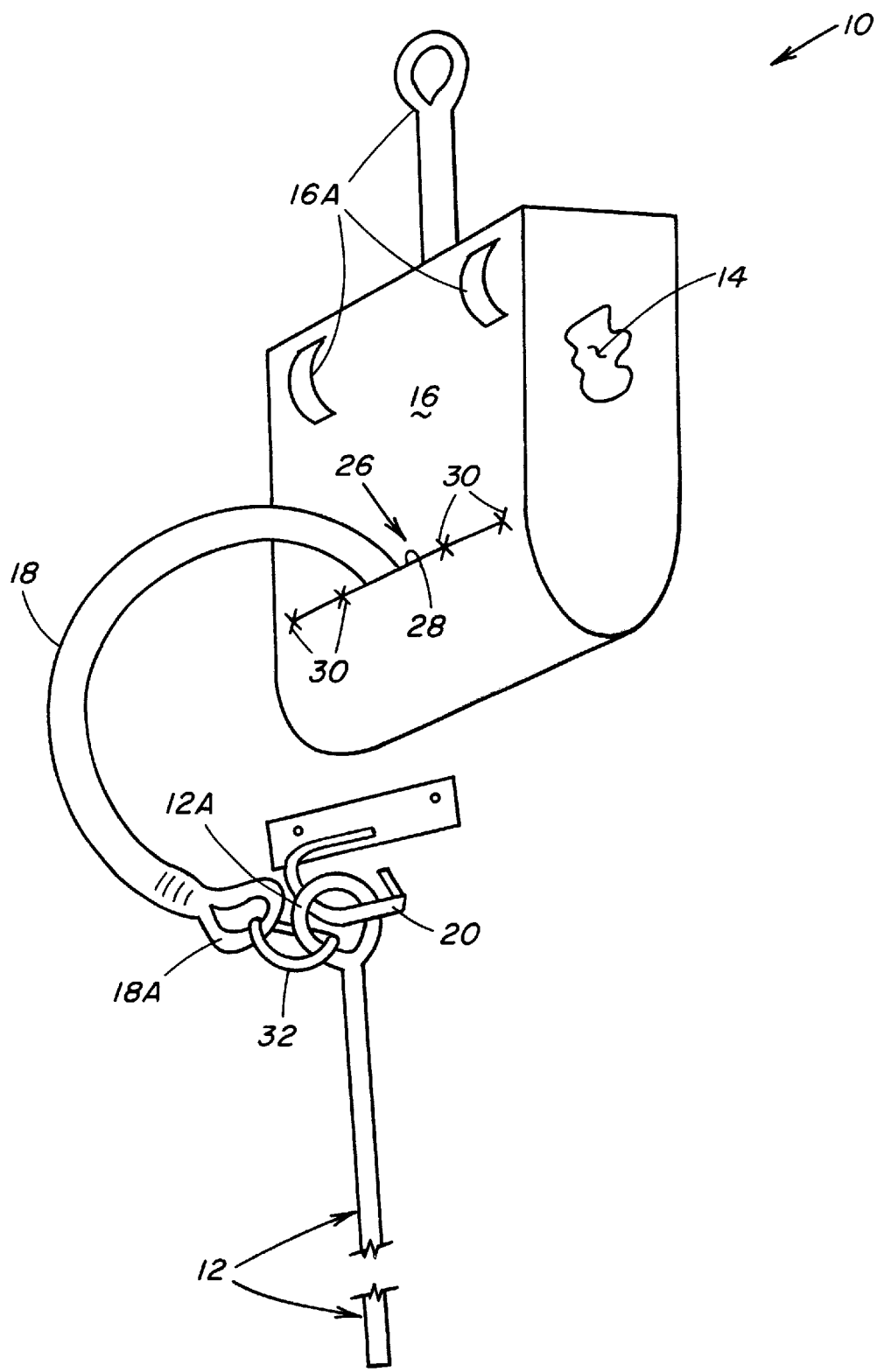
FIG. 1 is a perspective view of a first embodiment of a short-haul escape system of the present invention.
Figure 2:
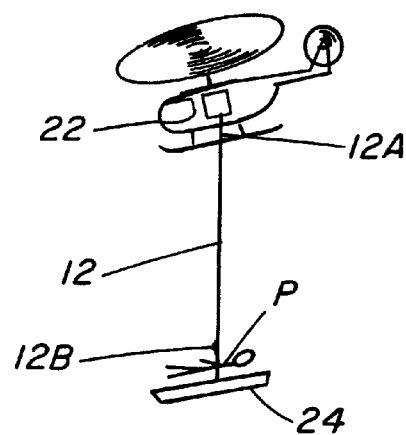
FIG. 2 is a diagrammatic view depicting a helicopter and a litter of the short-haul escape system of FIG. 1 suspended below and towed by the helicopter via a load line during the rescue of an injured person on the litter.
Figure 3:
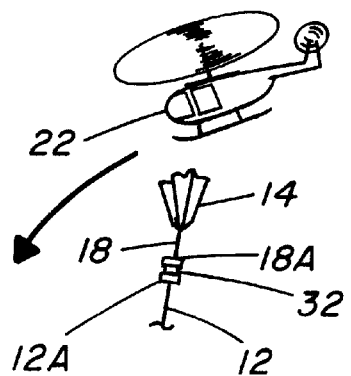
FIG. 3 is another diagrammatic view depicting the helicopter of FIG. 2 with engine trouble, the load line released from the helicopter, and a parachute of the system pulled away from a storage container of the system mounted on the helicopter.
Figure 4:
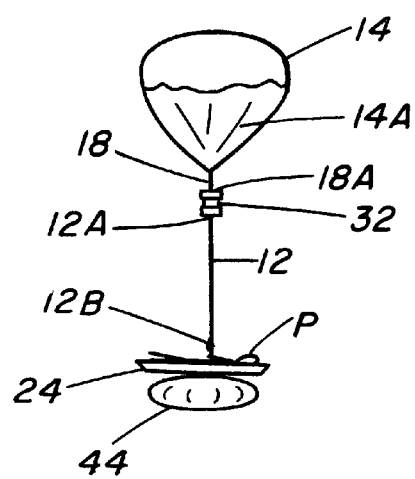
FIG. 4 is a further diagrammatic view depicting the parachute of the system now deployed and inflated such that the litter and person thereon will fall slowly to a soft landing on the ground.

Referring to the drawings and particularly to FIGS. 1–4, there is illustrated a first embodiment of a short-haul escape system, generally designated 10, of the present invention. Basically, the first embodiment of the short-haul escape system 10 includes the combination of an elongated load line 12, also sometimes referred to as a short-haul line, a parachute 14, a storage bag or container 16 or the like in which the parachute 14 is stored, and an interconnecting member, such as a flexible strap 18. In the first embodiment, the load line 12 has a loop 12A at one end detachably attached to a support member, such as a cargo support hook 20, on a load-transporting airborne vehicle, such as a helicopter 22, and is connected at an opposite end 12B to a load-carrying receptacle 24, such as a conventional litter, which supports an injured individual P and possibly a rescuer also. As non-limiting examples, the load line 12 can be 100–150 feet in length, the parachute 14 can be a thirty foot round parachute, the container 16 can be 12×16×8 inches in width, height and depth, and the flexible strap 18 can be 5 feet in length.

The container 16 has securing means such as in the form of loops 16A for attaching the container 16 to the helicopter 22 in proximity to the cargo support hook 20 and releasable means 26 such as in the form of a rupturable portion defined by a slit 28 in the container 16 and stitches 30 closing the slit 28 which will rupture or break to permit pullout release of the parachute 14 from the container 16. The flexible strap 18 is attached at one end to riser lines 14A of the parachute 14 stowed in the container 16 and extends from the container 16 through the slit 28 in the container 16 to an opposite looped end 18A of the strap 18 secured via suitable means such as a link 32 to the loop end 12A of the load line 12 that is also attached to the cargo support hook 20.

Thus, in the event of a failure of the helicopter engine and upon detaching of the one end 12A of the load line 12 from the cargo support hook 20, the load line 12 and load-carrying litter 24 will fall away from the helicopter 22. Also, the interconnecting member, the flexible strap 18, will concurrently pull the parachute 14 from the container 16 so that the parachute 14 can automatically inflate and slow the fall of the litter 24 and individuals thereon with the load line 12 to a soft landing.

Figure 5:
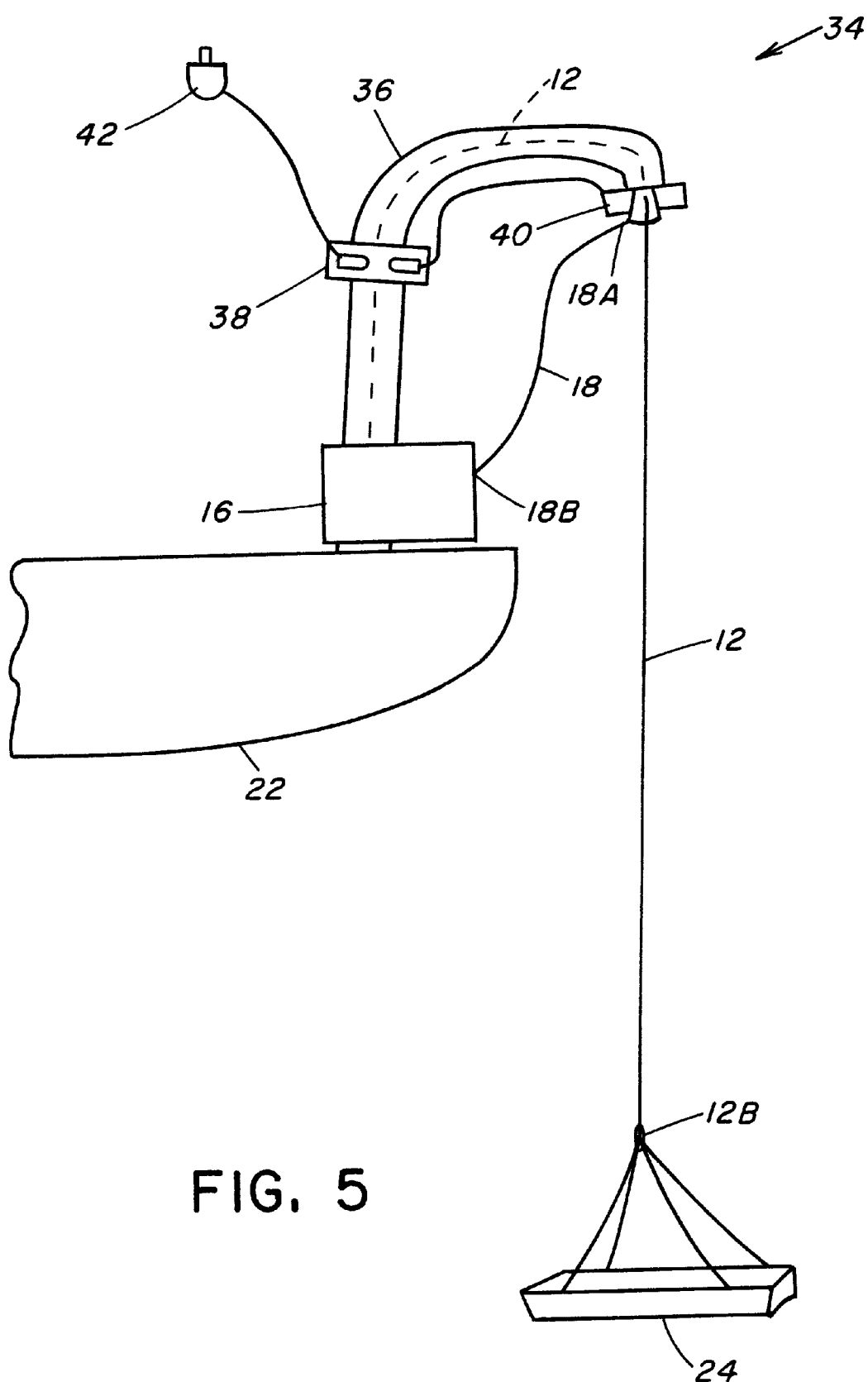
FIG. 5 is a second, or modified, embodiment of the short-haul escape system of the present invention.

Referring to FIG. 5, there is a second, or modified, embodiment of the short-haul escape system, generally designated 34, of the present invention. The second embodiment of the system 34 is a modification of the first embodiment to allow the features of its design to be used with hoist rescue and lifting operations. A hoist 36 on an airborne vehicle or helicopter 22 typically incorporate an emergency line cutter mechanism 38 to jettison the load line 12 and the litter 24 suspended therefrom in the event of an emergency. The modified system 34 now also incorporates a a crimp or swage device 40 which has an explosive charge (similar to the one that is used to actuate the cutter mechanism 38) that is mechanically or electrically actuated, just prior to cutting of the load line 12, to crimp or swage and thereby connect the interconnecting member 18 at one end 18A to the load line 12. The interconnecting member 18 at the other end 18B leads to the escape parachute P stored in the container 16 mounted on the helicopter 22. When the helicopter pilot or hoist operator decides to cut the load line 12, he pushes a button 42 causing the firing of a charge that drives a guillotine blade of the cutter mechanism 38 which, in turn, cuts the load line 12. Before the cutter mechanism is actuated, however, a mechanical or electrical timer of the swage device 40 causes the firing of an explosive charge at the end of the hoist 36 that attaches or connects the interconnecting member 18 to the load line 12. Then when the load line 12 is cut, the load line 12 and litter 24 fall away from the helicopter hoist 36 and the interconnecting member 18, being connected to the load line 12, pulls the parachute P out of the container 16 and the parachute P becomes deployed as the load line 12 and litter 24 fall away from the helicopter. The swage device 40, which can be incorporated at the end of the hoist 36 or into the cutter mechanism 38 that cuts the load line 12, is thus mechanically or electrically timed to fire before the cutter mechanism 38 fires. The parachute storage container 16 can be incorporated into the hoist 36 or located adjacent to it. Once the load line 12 is released, the operation of the modified system 34 is identical to the earlier-described system 10.

The above-described short-haul escape systems 10, 34 thus contemplates the following method of operation in the safe landing of a load-carrying receptacle or litter 24 being towed below an airborne vehicle in the event of a failure of the vehicle. The method of operation includes the steps of: (a) providing the container 16 having the parachute 14 stowed therein and releasable means 26 for permitting pullout release of the parachute 14 from the container 16; (b) attaching the container 16 to the load-transporting airborne vehicle 22 in proximity to a support member, such as the cargo support hook 20 or hoist 36, on the vehicle 22; (c) detachably attaching the load line 12 to the cargo support hook 20 or hoist 36 on the airborne vehicle 22 and attaching an end 12B of the load line 12 to the litter 24; (d) connecting one end of the interconnecting member or flexible strap 18 to the parachute 14 stowed in the container 16 and extending the strap 18 from the container 16 through the releasable means 26 of the container 16; (e) connecting an opposite end 18A of the strap 18 to the load line 12 attached to the cargo support hook 20 or hoist 36; (f) detaching the load line 12 from the cargo support hook 20 or hoist 36, such as in the event of a failure of the airborne vehicle 22, so as to cause the load line 12 and load-carrying receptacle or litter 24 to fall away from the airborne vehicle 22; and (g) in response to the detaching and falling away of the load line 12 from the cargo support hook 20 or hoist 36, pulling the parachute 14 from the container 16 by the strap 18 so that the parachute 14 can inflate and slow the fall of the receptacle or litter 24 and the load line 12 to a soft landing. The method also contemplates attaching an inflatable cushion 44 beneath the load-carrying receptacle or litter 24.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A short-haul escape system, comprising:

(a) an elongated load line for detachable suspension from a support member on a load-transporting airborne vehicle;

(b) a load-carrying receptacle attached to an end of the load line;

(c) a parachute;

(d) a container attachable to the airborne vehicle in proximity to the support member thereon and releasably stowing the parachute such that the parachute can be pulled from the container; and (e) an interconnecting member having opposite first and second ends, said interconnecting member being attached at said first end to the parachute stowed in the container, said interconnecting member extending from the container and said interconnecting member being secured at said second end to a portion of the load line located adjacent to the support member of the airborne vehicle such that upon detaching the load line from the support member of the airborne vehicle, which will cause the load line and load-carrying receptacle to fall away from the airborne vehicle, the load line will pull the interconnecting member away from the airborne vehicle and the interconnecting member, in turn, will pull the parachute from the container so that the parachute can inflate and slow the fall of the load line and receptacle to a soft landing.

2. The system of claim 1 wherein the container has a releasable means for permitting pullout release of the parachute from the container.

3. The system of claim 2 wherein the releasable means of the container is a rupturable portion of the container.

4. The system of claim 1 wherein the load line has a loop formed at an opposite end of the load line being removably receivable on the support member in the form of a cargo support hook on the airborne vehicle.

5. The system of claim 4 wherein the second end of the interconnecting member is coupled to the loop at the opposite end the load line by a link element.

6. The system of claim 1 wherein the second end of the interconnecting member is coupled to the load line and a force generating mechanism is provided which is actuatable to release the load line from the support member in the form of a hoist on the airborne vehicle.

7. The system of claim 6 wherein an explosive force is generated by the force generating mechanism to release the load line from the support member.

8. The system of claim 1 further comprising:
an inflatable cushion disposed beneath and attached to the load-carrying receptacle.

9. A short-haul escape system installed on a load-transporting airborne vehicle, the system comprising:
(a) a support member on a load-transporting airborne vehicle;
(b) an elongated load line detachably suspended from the support member of the airborne vehicle;
(c) a load-carrying receptacle attached to an end of the load line;
(d) a parachute;
(e) a container attached to the airborne vehicle in proximity to the support element thereof and releasably stowing the parachute such that the parachute can be pulled from the container; and
(f) an interconnecting member having opposite first and second ends, said interconnecting member being attached at said first end to the parachute stowed in the container, said interconnecting member extending from the container and said interconnecting member being secured at said second end to a portion of the load line located adjacent to the support member of the airborne vehicle such that upon detaching the load line from the support member of the airborne vehicle, which will cause the load line and load-carrying receptacle to fall away from the airborne vehicle, the load line will pull the interconnecting member away from the airborne vehicle and the interconnecting member, in turn, will pull the parachute from the container so that the parachute can inflate and slow the fall of the load line and receptacle to a soft landing.

10. The system of claim 9 wherein the container has a releasable means for permitting pullout release of the parachute from the container.

11. The system of claim 10 wherein the releasable means of the container is a rupturable portion on the container.

12. The system of claim 9 wherein the support member is a cargo support hook attached on the airborne vehicle and the load line has a loop at an opposite end thereof being removably receivable on the cargo support hook.

13. The system of claim 12 wherein the second end of the interconnecting member is coupled to the loop at the opposite end the load line by a link element.

14. The system of claim 9 wherein the support member is a hoist attached on the airborne vehicle, the second end of the interconnecting member is coupled to the load line, and a force generating mechanism is provided which is actuatable to release the load line from the hoist.

15. The system of claim 14 wherein an explosive force is generated by the force generating mechanism to release the load line from the support member.

16. The system of claim 9 further comprising:
an inflatable cushion disposed beneath and attached to the load-carrying receptacle.

17. A short-haul escape method, comprising the steps of:
(a) providing a container having a parachute stowed therein and releasable means for permitting pullout release of the parachute from the container;
(b) attaching the container to a load-transporting airborne vehicle in proximity to a support member on the vehicle;
(c) detachably attaching an elongated load line to the support member on the airborne vehicle and an end of the load line to a load-carrying receptacle;
(d) providing an interconnecting member having opposite first and second ends;
(e) connecting the first end of the interconnecting member to the parachute stowed in the container;
(f) extending the interconnecting member from the container through the releasable means of the container;
(g) connecting the second end of the interconnecting member to a portion of the load line located adjacent to the support member on the airborne vehicle;
(h) detaching the load line from the support member so as to cause the load line and load-carrying receptacle to fall away from the airborne vehicle; and
(i) in response to detaching the load line from the support member on the airborne vehicle, pulling the interconnecting member away from the airborne vehicle by the load line and pulling the parachute from the container by the interconnecting member so that the parachute can inflate and slow the fall of the load line and receptacle to a soft landing.

18. The method of claim 17 wherein the load line is manually detached from the support member in the event of a failure of the vehicle.

19. The method of claim 17 wherein an explosive force is generated to detach the load line from the support member in the event of a failure of the vehicle.

20. The method of claim 17 further comprising:
attaching an inflatable cushion beneath the load-carrying receptacle.

* * * * *